(12) United States Patent
Rutledge

(10) Patent No.: US 6,177,662 B1
(45) Date of Patent: Jan. 23, 2001

(54) INDUCTIVE HEATING METHOD AND APPARATUS

(76) Inventor: Peter John Rutledge, 7 Neil Street, North Ryde, New South Wales 2113 (AU)

( * ) Notice: Under 35 U.S.C. 154(b), the term of this patent shall be extended for 0 days.

(21) Appl. No.: 09/423,372
(22) PCT Filed: May 8, 1998
(86) PCT No.: PCT/AU98/00335
§ 371 Date: Dec. 21, 1999
§ 102(e) Date: Dec. 21, 1999
(87) PCT Pub. No.: WO98/49908
PCT Pub. Date: Nov. 12, 1998

(30) Foreign Application Priority Data

May 8, 1997 (AU) .................................................. PO6695

(51) Int. Cl.$^7$ .................................................. H05B 6/22
(52) U.S. Cl. .................. 219/652; 426/406; 426/234; 219/620
(58) Field of Search .................. 219/635, 624, 219/630, 660, 620, 674, 652, 653, 647; 426/234, 397, 406, 405

(56) References Cited

U.S. PATENT DOCUMENTS

| | | | |
|---|---|---|---|
| 3,961,150 | * 6/1976 | Lewis et al. | 219/652 |
| 4,339,645 | * 7/1982 | Miller | 219/634 |
| 4,990,347 | 2/1991 | Rasmussen et al. | 426/232 |
| 5,152,074 | * 10/1992 | Kishi | 34/247 |
| 5,202,160 | * 4/1993 | Schuppe et al. | 427/231 |
| 5,401,938 | * 3/1995 | Froeschke et al. | 219/602 |
| 5,690,851 | 11/1997 | Yoshioka et al. | 219/635 |
| 6,097,013 | * 8/2000 | Hoeck | 219/620 |

FOREIGN PATENT DOCUMENTS

| | | |
|---|---|---|
| 2 493 682 | 5/1982 | (FR) . |
| 2 501 631 | 9/1982 | (FR) . |
| 08001271 | 1/1996 | (JP) . |
| 08138136 | 5/1996 | (JP) . |

* cited by examiner

*Primary Examiner*—Teresa Walberg
*Assistant Examiner*—Jeffrey C Pwu
(74) *Attorney, Agent, or Firm*—Gifford, Krass, Groh, Sprinkle, Anderson & Citkowski, P.C.

(57) ABSTRACT

A method and apparatus (10) for the heating of convective material contained within the lumen of an inductive heating coil (12, 15, 16, 17) such that the cans (20) are rotated about their axes as they are heated. When the cans (20) are to be heated above the boiling point of their contents the cans (20) are passed through a rotary pressure lock (13, 19, 22) so that the heating of the contents of the cans (20) occurs under a super-atmospheric pressure.

36 Claims, 2 Drawing Sheets

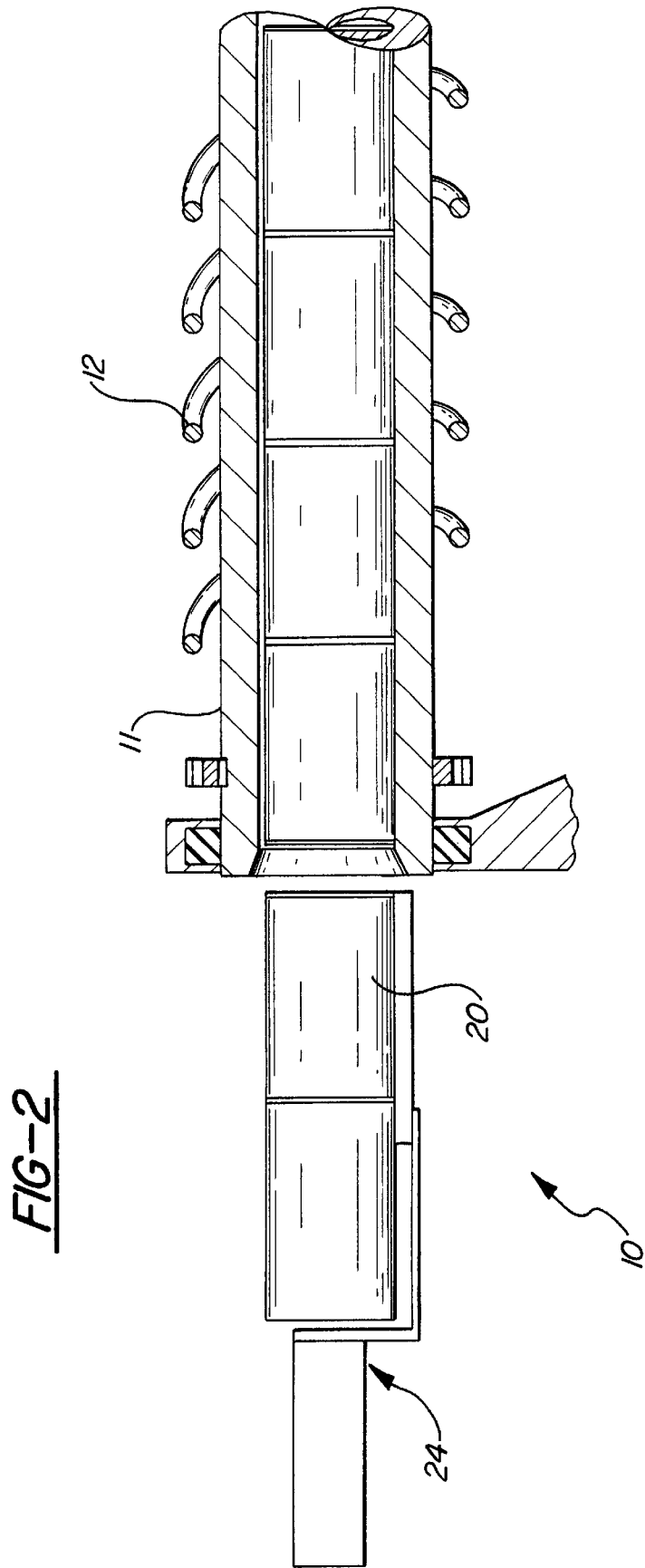

INDUCTIVE HEATING METHOD AND APPARATUS

TECHNICAL FIELD

The present invention relates to a method and apparatus for the heating of canned products. More particularly the invention relates to such a process and device that utilises induction heating from an induction coil to heat the contents of the can by induction heating the metal can.

BACKGROUND ART

It is well know that many canned goods such as canned food. canned pet food, and the like require to be sterilised after canning to prevent the growth of toxic bacteria in the can. This is a relatively energetic process and considerable efforts have been made to improve the energy efficiency of processes for the heat sterilising of canned goods. A further requirement of such processes is that, at least in the case of foods for human consumption, it is important to retain the flavour, texture and nutrient status of the contents of the can. Typically this requires the minimum heating possible consistent with the proper sterilisation of the food. A difficulty that then arises is that the rate at which heat can be transmitted to the canned product will affect the total heating time for the food. Many foods also have a tendency to burn onto the inside of the can if heated too quickly. The canner must then heat the can slowly to the sterilisation temperature which results in the contents of the can being maintained at all elevated temperature for considerably longer than is desirable for optimum taste, texture and nutrient status.

It has been proposed in U.S. Pat. No. 3,961,150 to heat canned goods by the application of heat to the can by the use of induction coils. The cans are described as being rotated in a reciprocating fashion beneath a flat induction coil. This arrangement was found in practice to be unsatisfactory. The time at which the contents of the can were maintained at an elevated temperature was excessive due to the problems of heat transfer rates, despite the reciprocating rotation of the cans.

French patent specification 2 501 631 describes an alternative arrangement in which cans are passed through the lumen of each of a plurality of helically wound induction coils. The cans are described as being rotated about their own axes between successive induction coils to allow homogenisation of the temperature of the contents of the cans. It is believed by the present inventors that in this design, where the cans are not rotated while they are actually being heated that either the rate of heating would have to be very low or there would be unacceptable burning of the contents against the can wall during the heating steps.

U.S. Pat. No. 4,256,922 describes the heating of loose foodstuffs on a rotating metallic tube surrounded by a helically wound coil. In this case the beat transfer problems are rather different due to the fact that the food is free to tumble and rotate relative to the tube unconstrained by a surrounding can.

The present invention is directed to an alternative method of heating canned product which offers an alternative to the known processes described above.

DISCLOSURE OF INVENTION

The present invention relates to a method for the heating of a convective material contained within a metallic can, the method including the steps of passing the can longitudinally through the lumen of a helically wound induction coil, while simultaneously rotating or oscillating the can. The present further relates to apparatus for the heating of a convective material contained within a metallic can, the device including a helically wound induction coil adapted to induce heating in the wall of the can, means to pass cans longitudinally through the lumen of the coil, and means to cause the cans to rotate about their own axes as they are passed through the coil.

The cans are preferably continuously rotated about a longitudinal axis. It is, however, within the ambit of the invention to oscillate or rotate the cans about any axis or randomly by tumbling the can.

The present inventors have found that by passing the cans through the lumen of a coil it is possible, at least using preferred embodiments of the invention, to effectively heat the can at a high rate with increased energy efficiency. They have also found that if the cans are simultaneously rotated at an appropriate rate it is possible with many canned products to heat the product very rapidly while avoiding the problems traditionally experienced with high heating rates.

It is preferred that the cans contain products that are liquid or are disposed in a liquid. This allows the product to move reasonably readily relative to the surface of the can as it is rotated about its axis. Such products are called convective products. Suitable convective products include canned pasta in a sauce, canned vegetables in liquid, and some canned pet foods.

The canned products are preferably rotated at least 50 rpm., more preferably at least 80 rpm, and even more preferably 120 rpm. In particularly preferred embodiments of the invention the cans are rotated at speeds of from 150 rpm to 200 rpm, preferably 180 rpm.

The calls for use in the process of the present invention must be metallic or there will be no electromagnetic currents generated in the call. Typically the cans will be formed of steel sheet coated with a protective metal such as tin. Any container in the walls of which heating may be induced by an oscillating electric current passing through the coil may be used in the present invention are for the purposes of the present invention regarded as being metallic cans.

The induction coil is, or coils are, driven at a frequency of from 1 to 500 kHz, preferably from 20 to 250 kHz. and more preferably from 50 to 200 kHz. In particularly preferred embodiments of the invention the frequency if from 60 to 180 kHz. The lower frequencies are cheaper to generate but suffer from the disadvantage that they heat more slowly. In any particular case there will be a trade off as between the cost of the process and the advantage to be obtained from more rapid processing of the canned product.

In a particularly preferred embodiment of the present invention the cans are passed through the lumen of an induction coil in a non metallic tube. The calls may be pushed through the tube or conveyed through it in any other suitable way. The cans may be rotated at any desired speed simply by rotating the tube at that speed. While this is a strongly preferred mode of carrying out the present invention it is recognised that there are many other ways of carrying out the present invention.

If the canned product is a non-acid convective food it is essential that it be heated at a temperature in excess of 100° C. if it is to be properly sterilised. Heating to this temperature may cause the contents to boil. The steam pressure from this boiling could cause the calls to distort or even rupture during heating. In order to avoid the possibility of this distortion it is preferred that the heating of such products be conducted in an atmosphere which is maintained at a super-atmospheric pressure. The cans may be pre heated to, say, 90° C. at atmospheric pressure and then passed through a pressure lock into an atmosphere at an elevated pressure and the heating completed. The heating step is most preferably carried out such that the contents of the can are heated at a rate of about 1° C. per second.

The heating is preferably carried out at the maximum rate possible until the can wall is at or above the maximum desired temperature. The can and its contents are then preferably allowed to rest for a period to allow equilibration of the contents of the can before further heating occurs. The can is most preferably rotated continuously throughout this resting period. If desired the rate of heating may be varied as the can is passed through the lumen of the coil in order to provide a complete or partial rest period. Alternatively there may be a plurality of coils in spaced apart array with a rest period between each coil.

Obviously in order to reduce the total time during which the contents of the can are elevated it is important to both raise and lower the temperature of the contents of the can quickly. The present inventors have found that if the cans that have been heated by the process according to the present invention are cooled while being rotated at the rate previously described as being advantageous for the heating step it is possible to more rapidly cool the contents of the can. The cooling step is preferably carried out under a stream of a cooling liquid such as water. Initially this cooling will be carried out in a super-atmospheric atmosphere. Once the temperature of the can and its contents has been reduced to about 100° C. the can should be removed to an atmospheric pressure environment and the cooling continued.

BRIEF DESCRIPTION OF DRAWINGS

The following description of a preferred embodiment of the present invention is provided as an example of the invention and is described with reference to the accompanying drawings in which:

FIG. 2 is a schematic vertical sectional view through a part of an apparatus according to the present invention.

BEST MODE FOR CARRYING OUT THE INVENTION

Figure 1:
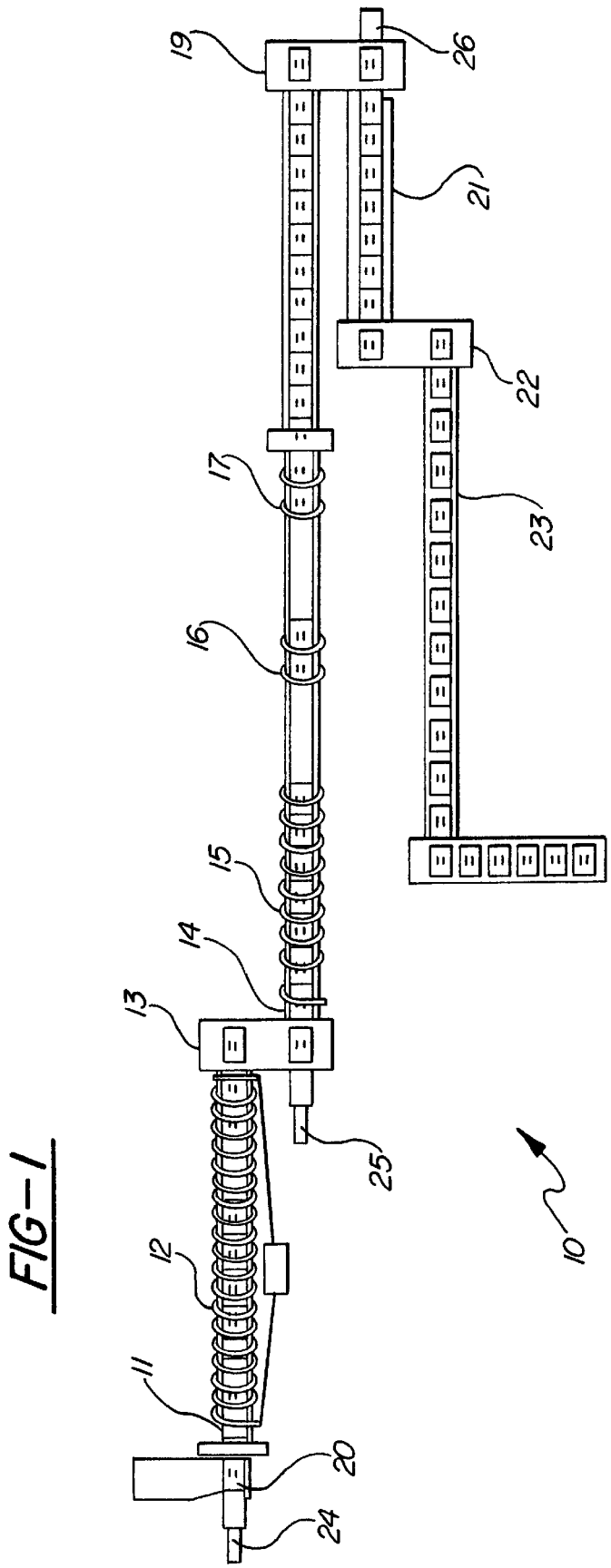
FIG. 1 is a schematic representation of a device for the carrying out of the process according to the present invention seen in plan view.

The device 10 depicted in FIG. 1 is arranged to carry out a process of heat sterilisation of canned food products. The food products are non-acid convective foods. Typical examples include canned peas and spaghetti in tomato sauce. These foods are contained within conventional tin plated steel cans.

The device 10 includes an inlet tube 11 arranged to be rotated about its longitudinal axis at approximately 200 rpm. The tube 11 passes through the lumen of a first induction coil 12. This coil 12 is driven by a suitable source of an alternating current of 200 kHz. Cans 20 are forced through the tube 11 by pusher means 24. These pusher means 24 are operated to introduce cans 20 into tube 11 periodically and incrementally so that as one can 20 is introduced into the tube 11 another is ejected from its other end, The passage time of cans 20 through the tube 11 is so adjusted that the cans are heated to a temperature of about 90° C. by the time they reach the outlet end of the tube 11. The size of the coil 12 and the current put through it is so selected that the cans are heated at the maximum rate possible without the contents of the can burning against the inside surface of the can. At a rotation speed of the tube 11 of 200 rpm it has been found that the coil can be driven such that the cans 20 passing through the tube 11 are heated at a rate of 1° C./sec.

Cans 20 pushed out of the outlet end of tube 11 are pushed into a first transfer lock 13. This lock 13 transfers cans 20 from the atmospheric pressure environment of the tube 11 to a super-atmospheric environment of a second tube 14. This super-atmospheric pressure is controlled by the admission of compressed air to the tube 14 through air inlet 18. The tube 14 is rotated about its longitudinal axis at the same speed as the tube 11. Cans 20 are pushed along tube 14 by further pusher means 25 so that as each can 20 is introduced into the tube 14 another is being ejected from its discharge end. The tube 14 passes through the lumen of three successive induction coils 15, 16 and 17. These coils are driven in the same manner as the coil 12. The can wall is heated to about 130° C. by the coil 15. The can then undergoes a rest period before being further heated by coil 16. The process is then repeated and the can is heated for a final time by coil 17. The total heating regime is such that the contents of the can will have been sterilised in the minimum possible time.

Cans 20 that have been sterilised in tube 14 are ejected into a second transfer lock 19. This lock transfers cans from the super-atmospheric environment of the heating tube 14 to the super-atmospheric environment of a first cooling tube 21.

The tube 21 is rotated about its longitudinal axis just as the previous tubes 11 and 14 are. Similarly pusher means 26 are provided to transfer cans through the tube 21. In the tube 21 the cans are sprayed (by means not shown) with water to cool them down, it has been found that this cooling step is much more efficient at the very high rotation rate of the tube 21, and thus of the cans. The cooling means in tube 21 are adjusted so that the cans being ejected from the discharge end of the tube 21 have a temperature of about 100° C. They are discharged into a third transfer lock 22 which transfers the cans from the super-atmospheric atmosphere of the tube 21 to the atmospheric atmosphere of a cooling conveyor 23. This conveyor 23 is designed to allow the cans 20 to be rotated about their longitudinal axes and is also provided with cooling means (not shown) such as water sprays to reduce the temperature of the cans 20 to a temperature a little above ambient.

It has been found that by passing the cans through the lumen of the coils 12, 15,16 and 17 it is possible to effectively sterilise the contents of the cans while reducing the total time during which the contents of the can are held at an elevated temperature considerably, as compared with conventional sterilisatioin means. This in turn translates into the contents of the cans showing improved colour, organoleptic and nutrient status properties as compared with conventionally sterilised canned foods.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for the heating of a liquid or a material disposed in a liquid, contained within a metallic can, the method including the steps of passing the can longitudinally through the lumen of a helically wound induction coil, heating the can within the lumen of the induction coil, while simultaneously rotating or oscillating the can.

2. A method as claimed in claim 1 in which the can is continuously rotated about a longitudinal axis.

3. A method as claimed in claim 1 in which the can is rotated at least 50 rpm.

4. A method as claimed in claim 3 in which the can is rotated at speeds of from 150 to 200 rpm.

5. A method as claimed in claim 1 in which the can is formed of steel sheet coated with a protective metal.

6. A method as claimed in claim 1 in which the can is passed through the lumen of an induction coil in a non metallic tube.

7. A method as claimed in claim 6 in which the tube is pressurised.

8. A method as claimed in claim 1 in which the induction coil is, or coils are, driven at a frequency of from 1 to 500 kHz.

9. A method as claimed in claim 8 in which the induction coil is, or coils are, driven at a frequency of from 60 to 180 kHz.

10. A method as claimed in claim 1 in which the cans is pre-heated to a temperature below the boiling point of the contents of the can at atmospheric pressure and then passed through a pressure lock into an atmosphere at an elevated pressure and the heating completed.

11. A method as claimed in claim 1 in which the heating step is carried out such that the contents of the can are heated at a rate of about 1° C. per second.

12. A method as claimed in claim 1 in which the can is cooled while being rotated.

13. A method as claimed in claim 12 in which the cooling is carried out under a stream of a cooling liquid such as water.

14. A method as claimed in claim 12 in which the cooling is carried out initially in a super-atmospheric atmosphere, once the temperature of the can and its contents has been reduced to about 100° C. the can is removed to an atmospheric pressure environment and the cooling continued.

15. Apparatus for the heating of a convective material contained within a metallic can, the apparatus including a helically wound induction coil adapted to induce heating in the wall of the can, means to cause cans to move longitudinally through the lumen of the coil, and means to cause the cans to rotate about their own axes as they are passed through the coil.

16. Apparatus as claimed in claim 15 in which the means to cause the cans to rotate comprises a non-metallic tube disposed within the linen of the coil and rotatable about its own longitudinal axis.

17. Apparatus as claimed in claim 16 in which the means to cause the can to move longitudinally through the tube comprises a ram adapted to reciprocate between an extended position in which it applies a pushing force to the end of a can to push it into the tube and a retracted position in which a can may be introduced between the ram and the tube.

18. Apparatus as claimed in claim 15 in which the means to cause the cans to rotate is such that the cans are rotated at least 50 rpm.

19. Apparatus as claimed in claim 18 in which the means to cause the cans to rotate is such that the cans are rotated at speeds of from 150 rpm to 200 rpm.

20. Apparatus as claimed in claim 15 in which the means are provided to pressurise the cans as they are being fed through at least a part of the induction coil.

21. Apparatus as claimed in claim 15 in which the induction coil is, or coils are, driven at a frequency of from 1 to 500 kHz.

22. Apparatus as claimed in claim 21 in which the induction coil is. or coils are, driven at a frequency of from 60 to 100 kHz.

23. Apparatus as claimed in claim 15 in which the apparatus includes an induction coil to pre-heat the cans to a temperature below the boiling point of tile contents of the can at atmospheric pressure, a pressure lock into an atmosphere at an elevated pressure. means to move the can through the pressure lock and an induction coil to complete the heating of the can.

24. Apparatus as claimed in claim 15 in which the induction coil(s) is such that the contents of the can are heated at a rate of about 1° C. per second.

25. Apparatus as claimed in claim 15 in which cooling means are provided to cool the can while it is being rotated.

26. Apparatus as claimed in claim 25 in which the cooling means includes a stream of a cooling liquid such as water.

27. A method as claimed in claim 3 in which said can is rotated at least 80 rpm.

28. A method as claimed in claim 27 in which said can is rotated at least 120 rpm.

29. A method as claimed in claim 4 in which the can is rotated at a speed of substantially 180 rpm.

30. A method as claimed in claim 8 in which the induction coil is, or coils are, driven at a frequency of from 20 to 250 kHz.

31. A method as claimed in claim 30 in which the induction coil is, or coils are, driven at a frequency of from 50 to 200 kHz.

32. Apparatus as claimed in claim 18 in which the means to cause the cans to rotate is such that the cans are rotated at least 80 rpm.

33. Apparatus as claimed in claim 32 in which the means to cause the cans to rotate is such that cans are rotated at least 120 rpm.

34. Apparatus as claimed in claim 19 in which the means to cause the cans to rotate is such that cans are rotated at speeds of substantially 180 rpm.

35. Apparatus as claimed in claim 21 in which the induction coil is, or coils are, driven at a frequency of from 20 to 250 kHz.

36. Apparatus as claimed in claim 35 in which the induction coil is, or coils are, driven at a frequency of from 50 to 200 kHz.

* * * * *